United States Patent [19]

Velan

[11] 4,356,832
[45] Nov. 2, 1982

[54] HIGH PRESSURE BONNETLESS VALVE

[75] Inventor: Adolf K. Velan, Westmount, Canada

[73] Assignee: Velan Engineering Ltd., Montreal, Canada

[21] Appl. No.: 253,381

[22] Filed: Apr. 13, 1981

[51] Int. Cl.³ .................... F16K 43/00; F16K 41/02
[52] U.S. Cl. .................................. 137/15; 137/315;
251/214; 251/267; 251/330; 277/108; 277/113
[58] Field of Search .............. 137/15, 315; 251/267,
251/268, 269, 330, 214; 277/107, 108, 113, 110, 116.2

[56] References Cited

U.S. PATENT DOCUMENTS

| | | | |
|---|---|---|---|
| 1,995,395 | 3/1935 | Mohr | 137/315 |
| 2,694,547 | 11/1954 | MacGregor | 251/330 |
| 2,780,233 | 2/1957 | Volpin | 137/315 |
| 3,257,095 | 6/1966 | Siver | 251/330 |
| 3,851,853 | 12/1974 | Teeters | 251/330 |

FOREIGN PATENT DOCUMENTS 638003   5/1950  United Kingdom ............... 251/267

Primary Examiner—George L. Walton
Attorney, Agent, or Firm—Alan Swabey; Robert Mitchell; Guy Houle

[57] ABSTRACT

A method of removing from a valve, a backseat and packing means, without the necessity of first removing the packing means from the body of the valve so as to provide access for removal of the backseat, comprising the steps of: (a) providing a member and with the same cooperatively engaging the backseat for purpose of removing the same from the valve; (b) manipulating the member so as to release the backseat from its secured position within the body of the valve; and (c) further manipulating the member to withdraw the backseat and the packing means from the valve body. There is provided an apparatus for carrying out the aforementioned method.

16 Claims, 4 Drawing Figures

HIGH PRESSURE BONNETLESS VALVE

BACKGROUND OF INVENTION (a) Field of the Invention

The present invention relates to improvements in valves and more particularly to improvements in bonnetless valves for high pressure applications. The present invention also relates to a method of servicing the aforesaid valves.

(b) Description of Prior Art

High pressure globe valves half inch to four inch, for steam and high pressure processing in industry, power, ship building, etc. are made in two different styles so as to eliminate any possibility of body-bonnet leakage. Gasketed joints between body and bonnet which may develop leaks are not acceptable. This problem is solved in two well known ways. The first one is to provide a screwed-in bonnet which is thereafter seal welded. Examples of such valves include: The Rockwell-Edward forged steel Univalve*; R.P&C Valve, Division of White Consolidated Industries, Inc. Class 1500 and 2500Y Pattern globe valves; Henry Vogt Machine Co. valves of the 1700-255 pounds service class; valves manufactured by Bont, and Serseg in France, include non-turning stems. Valves of the type featuring a bolted bonnet which is thereafter seal welded are also available. Examples of such valves include the Babcock NICO 3000 Type 111-234 globe valves with integral backseat on the bonnet. All such valves are difficult to disassemble for servicing, as the seal weld has to be cut, which is a difficult operation to perform in for example a nuclear power station, in a radioactive environment or in inaccessible locations. Furthermore, the problem is compounded following servicing of the valve since the joint has to be rewelded, which is costly and generally difficult to perform in the field. The solution to this problem has been awaited for a number of years.
*Trade Mark of Rockwell Flow Control Division of Rockwell-Edward The aforementioned second way is to provide valves of the bonnetless type without any weld. Valves of this type are manufactured in North America by the applicant; Yarway Corporation under the trade name Weldbond* and Dresser Industries Inc. Only applicant's valves however are made from a single body forging without any weld. In the case of Dresser, the valve body comprises two pieces which are then welded together to become a single body. In the case of Yarway, the yoke is screwed on the body and thereafter welded so that the unit also becomes bonnet-less like applicant's. German manufacturers—Babcock and Sempell—and French manufacturer Sapag offer bonnetless valve, however, a substantial servicing problem exists in respect of these valves. This concerns removal of internal parts in the line due to screwed in backseats. In all existing designs, the backseat has to be screwed in place in the body of the valve and thereafter covered up with packing rings. These packing rings are pressed into the valve body packing chamber in order to provide a seal between the valve stem and the valve body. To disassemble the valve, one has to remove each individual packing ring first, which although is less costly and difficult than removing welds and rewelding as discussed above in respect to body bonnet welded joint type valves, it is still a very time consuming and therefore expensive operation. Once the packing rings are removed, the backseat is removed with a special tool and servicing may then commence. The assembly of such valves is relatively easy. It has been noted that Babcock and Sempell offer bonnetless valves only for those applications where a backseat is not required and offer a bolted bonnet, seal welded valve for applications requiring a backseat.
*Trade Mark of Yarway Corporation

SUMMARY OF INVENTION

It is a prime object of the present invention to provide an improved valve design which overcomes the aforementioned disadvantages.

Is is therefore an important object of the present invention to provide a means enabling removal of the backseat from a valve without the necessity of first having to remove packing means such as individual rings which seal the space between the valve stem and the valve body.

It is a further important object of the present invention to provide a simple means enabling the removal of the packing means from a valve e.g. packing rings and also all internal valve parts from the valve body and do this while the valve is welded into a piping system.

In one aspect of the present invention there is provided in a valve, including a valve body, a stem, a backseat and packing means for providing a seal between said stem and said valve body, the improvement comprising: means on said stem engageable with said backseat for use in disengaging said backseat from said valve body, thereby permitting withdrawal and removal of said backseat from said valve body, and avoiding the necessity of first removing said packing means from said valve body so as to provide access for removal of said backseat.

In a further aspect of the present invention there is provided an assembly for use in a valve body comprising: (a) a valve stem; (b) packing means on said stem for use in providing a seal between said stem and said valve body; and (c) a backseat interconnected to said stem in such manner as to permit positive torquing forces to be transmitted from said stem to said backseat, for use in assembling or disassembling said backseat respective said valve body.

In a further aspect of the present invention there is provided apparatus for removing, from a valve, a backseat and stem packing means, without the necessity of first removing the packing means from the body of the valve so as to provide access for removal of the backseat comprising a member cooperatively engageable with said backseat for releasing the same from its secured position with said valve.

In a still further aspect of the present invention there is provided a method of removing from a valve, a backseat and stem packing means, without the necessity of first removing the packing means from the body of the valve so as to provide access for removal of the backseat, comprising the steps of: (a) providing a member and with the same cooperatively engaging the backseat for purpose of removing the same from the valve; (b) manipulating the member so as to release the backseat from its secured position within the body of the valve; and (c) further manipulating the member to withdraw the backseat and the packing means from the valve body.

BRIEF DESCRIPTION OF DRAWINGS

The invention is illustrated by way of example in the accompanying drawings wherein.

DESCRIPTION OF PREFERRED EMBODIMENTS

Figure 1:
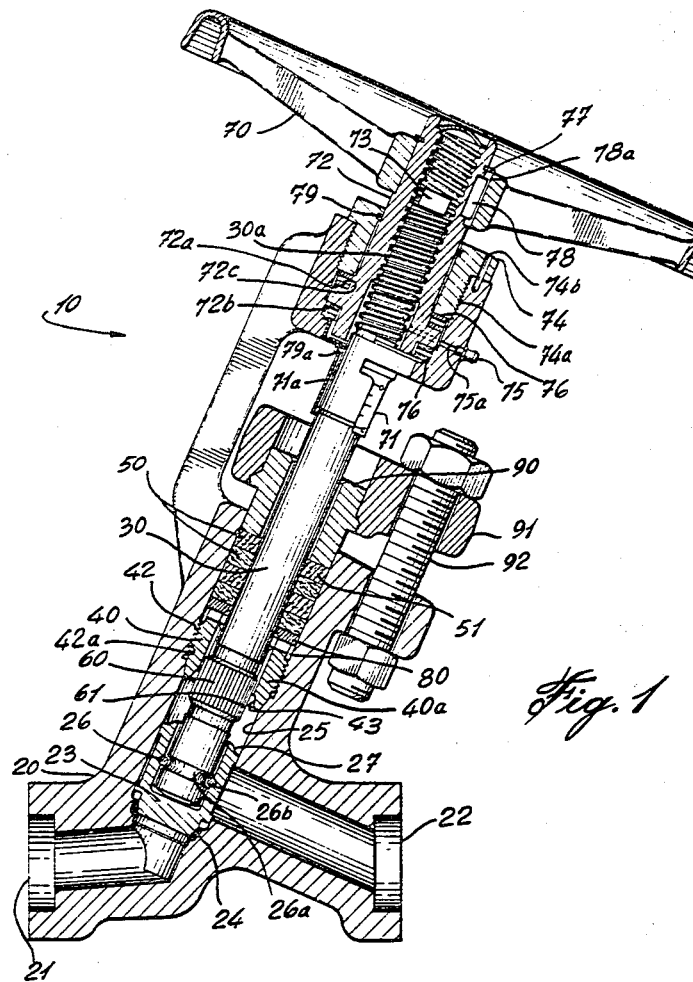
FIG. 1 is a sectional view of a valve in accordance with the present invention.

Referring now in detail to the drawings, there is shown a valve 10 having a valve body 20; a stem 30; a backseat 40 and a packing means 50, providing a seal between stem 30 and valve body 20. Located upon stem 30 is a means 60 shown engaging backseat 40. Means 60, as will be better appreciated from the description hereinafter, is used for disengaging backseat 40 from valve body 20 and permitting in-line withdrawal and removal of backseat 40 from valve body 20. This avoids the necessity of first removing packing means 50 from valve body 20 so as to provide access for removal of backseat 40. Valve 10 is of the high pressure bonnetless type.

Valve body 20 comprises a single body forging having ports 21 and 22, the flow from one to the other through the body 20 being controlled by valve disc 23, which is moved toward and away from valve seat 24 by reciprocal movement of stem 30.

Reciprocating movement of stem 30 is controlled by rotation of handwheel 70 mounted in parts, screwed into the upper part of valve body 20. As will be evident from the drawing and description hereinafter, stem 30 normally does not rotate during the operation of opening and closing valve 10. Selected rotation of handwheel 70 in a first direction merely moves stem 30 via screw thread 30a outwardly of valve body 20 while rotation of handwheel 70 in the second and opposite direction, moves stem 30 inwardly of valve body 20. A graduated scale 71 appears on bushing 71a and is provided to show the reciprocating movement of stem 30 and thus the degree of opening and closing of disc 23 controlling the flow through valve body 20.

Referring to the mounting of handwheel 70, such will be seen to comprise a bushing 72 threaded to receive the treaded end of stem 30, which includes a pair of flats 73, only one of which is seen, and which provide wrench engaging means for use in selectively rotating stem 30, respectively for removal or insertion of backseat 40, discussed more fully hereinafter. Bushing 72 is secured in place in the upper part of valve body 20 by nut bushing 74 having threads 74a, rotation of which relative to valve body 20 is prevented by a dowel pin 74b. A fitting 75 communicates lubrication via passageway 75a to the threads of stem 30 and bushing 72. As will be further seen bushing 72 includes a flange 72a having a pair of thrust bearing faces 72b and 72c engaged by thrust bearings 76.

Referring once more to handwheel 70 and the mounting thereof upon stem 30, it will be seen to be secured in well known manner utilizing a circlip 77 and keyed for rotation by key 78 in keyway 78a. A seal 79 is provided between bushing 72 and nut bushing 74. A further seal 79a is provided between stem 30 and the inner wall of bushing 71a.

Stem 30 as noted previously, includes means 60 which comprises a male spline 61 adapted to matingly engage a female spline 41 in backseat 40. It will be evident that reciprocal movement of stem 30 increases or decreases spline engagement between stem 30 and backseat 40. Although not shown, if desired, valve body 20 could be increased in length i.e. axially of stem 30, to provide total disengagement of splines 61 and 41. Stem 30 is interconnected adjacent the end thereof to valve disc 23 by ring means 26 facilitated within grooves 26a and 26b respectively in stem 30 and valve disc 23 and thus reciprocating movement is imparted to valve disc 23 by stem 30 within bore 25. It is visualized means 60 might comprise an alternative design which does not utilize splines although splines are deemed to provide a very satisfactory means.

Backseat 40 comprises a bushing 40a having external threads 42 for use in securely screwing the same into place via threads 42a within valve body 20.

As is evident from the drawing, backseat 40 includes concave face 43 for matingly engaging convex face 27 of valve disc 23, when in its fully withdrawn position and which permits maximum flow through valve body 20 via ports 21 and 22. It is visualized backseat 40 could be secured in position within valve body 20 by other suitable means besides screw threads, noted to be ones particularly convenient means. Thus it is deemed well within the scope of those skilled in the art of valves of the present type to provide alternative securing means and therefore the invention is not deemed limited by the securing means disclosed.

Packing means 50 may be of any suitable type including that shown in the drawing and which comprises a plurality of packing rings 51 constructed from suitable well known material. Located intermediate packing means 50 and backseat 40, is a two piece gland follower 80 which acts to assist removal of packing means 50 from valve body 20, discussed hereinafter.

A gland retainer 90 slidingly engages valve body 20 and is retained in position by flange 91 secured in place by bolt and nut assembly 92. Thus retainer 90, bears against packing means 50 in abutting relationship therewith and allows stem 30 to pass freely therethrough.

The drawing illustrates valve 10 in flow closed position. Operation of valve 10 to provide an open flow position through valve body 20 is clearly evident from the drawing and the aforementioned description and merely involves rotation of handwheel 70, the degree of flow through the valve being indicated by graduated scale 71.

Valve 10 is constructed using well known suitable materials deemed familiar to those skilled in the art of valve manufacture. Valve body 20, which, as indicated previously, is a single body forging, is deemed part of the novel design according to the invention.

In order to service valve 10 in respect of replacement of backseat 40, all that is required, following removal of gland retainer 90 and related parts from valve body 20, is to position the respective splines of means 60 and backseat 40 into mating engagement, this being accomplished by rotating stem 30 with a wrench straddling flats 73, removal of necessary parts being made to facilitate such, to thus unwind backseat 40 from its threaded secured position within valve body 20. Resulting axial movement of backseat 40 causes pushing movement against gland follower parts 80 which in turn apply pushing movement to remove packing means 50 from valve body 20.

Figure 3:
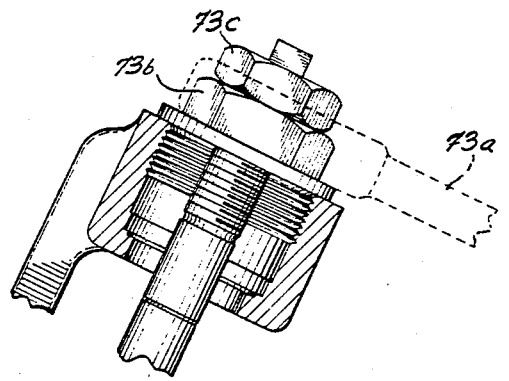
FIGS. 2, 4 and 3 are respectively sectional views and a part sectional view of the valve shown in FIG. 1, showing stages of disassembly of the backseat from the valve body.
Figure 2:
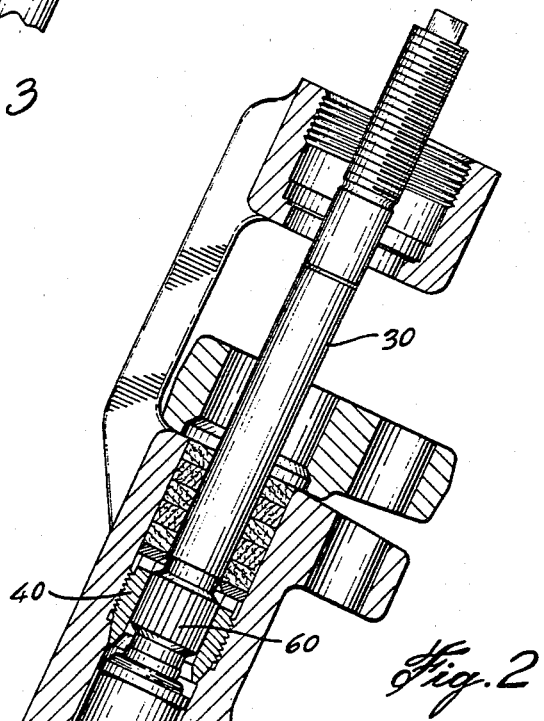
Figure 4:
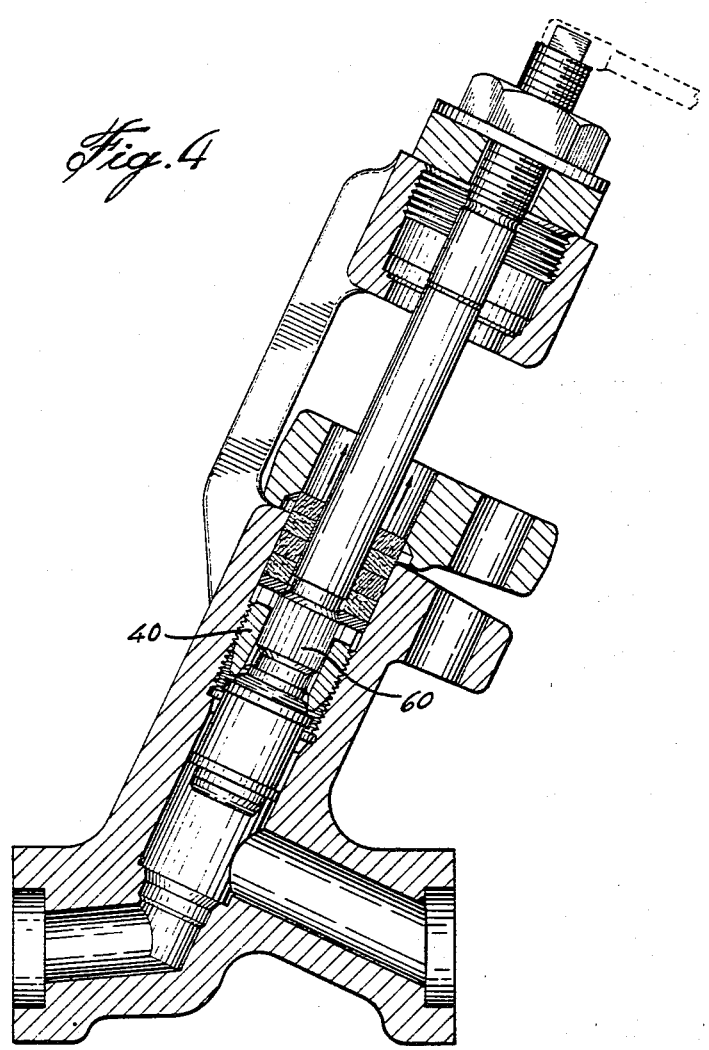

Attention is directed to FIGS. 2 to 4 inclusive which illustrate the backseat removal procedure more clearly. FIG. 2 shows stem 30 and more particularly the splined portion thereof positioned relative to backseat 40, in readiness for applying torquing forces thereto by spline means 60, to remove backseat 40 when stem 30 is rotated with wrench 73a, seen in FIG. 3. To facilitate the removal operation, it will be noted gland retainer 90 is removed and nuts 73b and 73c applied to stem 30, as shown in FIG. 3. FIG. 4 shows backseat 40 in released position, prior to in-line withdrawal and with packing rings 50 partially withdrawn from valve body 20.

Thus, the backseat 40 released from its secured position within valve body 20, it may be in-line withdrawn therefrom along with packing means 50 and stem 30. Accordingly, there is no necessity to first remove packing means 50 from valve body 20 to provide access for the removal of backseat 40.

I claim:

1. In a valve, including a valve body, a stem, a backseat and packing means for providing a seal between said stem and said valve body, the improvement comprising: a rotational interlock between said backseat and said valve body, means on said stem engageable with said backseat for use in rotating said backseat and disengaging said backseat from said valve body, thereby permitting withdrawal and removal of said backseat from said valve body, and avoiding the necessity of first removing said packing means from said valve body so as to provide access for removal of said backseat.

2. A valve as defined in claim 1 wherein said valve is a high pressure bonnetless type.

3. A valve as defined in claim 2 wherein said valve body comprises a single forging.

4. A valve as defined in claims 1 or 2 wherein said backseat is secured in place in said valve body by a screw thread.

5. A valve as defined in claims 1, 2 or 4 wherein said packing means comprising a plurality of packing rings.

6. A valve as defined in claim 1 wherein said backseat includes a female spline and said means on said stem comprises a male spline for matingly engaging the female spline on said backseat.

7. A valve as defined in claim 1 wherein a gland follower is located intermediate said backseat and said packing means.

8. A valve as defined in claim 1 wherein said stem includes wrench engaging means for use in torquing said stem to facilitate rotation and removal of said backseat from said valve body.

9. A valve as defined in claim 1 wherein said stem is non-rotatable relative to said valve body in normal valve operating mode.

10. A valve as defined in claim 1 wherein said means on said stem engageable with said backseat is non-rotatable relative to said valve body in normal valve operating mode.

11. A valve as defined in claim 1 wherein said means on said stem engageable with said backseat is movable in an axial direction for respectively engaging or disengaging said backseat.

12. An assembly for use in a valve body comprising:
    (a) a valve stem;
    (b) packing means on said stem for use in providing a seal between said stem and said valve body; and
    (c) a backseat, means on said backseat for forming a rotational interlock with said valve body, cooperating means on said valve stem and said backseat to permit positive torquing forces to be transmitted from said valve stem to said backseat for use in assembling and disassembling said backseat respective said valve body.

13. Apparatus for removing, from a valve, a backseat and packing means, without the necessity of first removing the packing means from the body of the valve so as to provide access for removal of the backseat, and said backseat having a rotational interlock with said valve body; said apparatus comprising a valve stem of said valve cooperatively engageable with said backseat for effecting rotation of said backseat for releasing the same from its secured position within said valve.

14. Apparatus as defined in claim 13 wherein said valve is of the high pressure bonnetless type, said backseat is secured in place by a screw thread and said packing means comprises packing rings.

15. A method of removing from a valve, a backseat and packing means, without the necessity of first removing the packing means from the body of the valve so as to provide access for removal of the backseat, said method comprising the steps of:
    (a) providing a valve stem for said valve and cooperatively interlockingly engaging said valve stem with the backseat for purpose of removing the same from the valve;
    (b) rotating said valve stem so as to rotate and release the backseat from its secured position within the body of the valve; and
    (c) further manipulating said valve stem to withdraw the backseat and the packing means from the valve body.

16. A method of removing from a bonnetless high pressure valve having a valve stem, a screwed-in backseat; and packing means providing a seal between the stem and the body of the valve, without the necessity of first removing the packing means from the body of the valve so as to provide access for removal of the backseat, said method comprising the steps of:
    (a) providing interlocking means on said valve stem and cooperatively interlockingly engaging the member with the backseat for purpose of removing the same from the valve;
    (b) manipulating said interlocking means so as to unscrew the backseat from its secured position in the body of the valve; and
    (c) further manipulating, including continued in-line movement, said valve stem to withdraw the backseat and the packing means from the valve body.

* * * * *